(12) United States Patent
Dyck et al.

(10) Patent No.: US 8,689,230 B2
(45) Date of Patent: *Apr. 1, 2014

(54) DETERMINATION OF RUNNING STATUS OF LOGICAL PROCESSOR

(75) Inventors: Greg A. Dyck, Morgan Hill, CA (US); Mark S. Farrell, Pleasant Valley, NY (US); Charles W. Gainey, Poughkeepsie, NY (US); Jeffrey P. Kubala, Poughquag, NY (US); Robert R. Rogers, Beacon, NY (US); Mark A. Wisniewski, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,400

(22) Filed: Sep. 14, 2012

(65) Prior Publication Data
US 2013/0014123 A1    Jan. 10, 2013

Related U.S. Application Data

(63) Continuation of application No. 11/470,487, filed on Sep. 6, 2006, now Pat. No. 8,276,151.

(51) Int. Cl.
*G06F 9/46* (2006.01)
*G06F 13/00* (2006.01)
*G06F 11/00* (2006.01)

(52) U.S. Cl.
USPC ........... 718/104; 718/105; 711/150; 711/151; 711/152; 714/5.11; 714/10

(58) Field of Classification Search
None
See application file for complete search history.

(56) References Cited

U.S. PATENT DOCUMENTS

| | | | |
|---|---|---|---|
| 6,108,757 A | 8/2000 | Arshad | |
| 6,148,415 A | 11/2000 | Kobayashi et al. | |
| 7,650,469 B2 | 1/2010 | Dyck et al. | |
| 2002/0107854 A1 | 8/2002 | Hua et al. | |
| 2003/0055864 A1 | 3/2003 | Armstrong et al. | |
| 2003/0105796 A1 | 6/2003 | Sandri et al. | |
| 2003/0236817 A1 | 12/2003 | Radovic et al. | |
| 2004/0107374 A1* | 6/2004 | Cooper et al. | 713/320 |
| 2005/0108711 A1* | 5/2005 | Arnold et al. | 718/100 |
| 2006/0036889 A1* | 2/2006 | Arai | 714/1 |
| 2006/0037021 A1* | 2/2006 | Anand et al. | 718/102 |
| 2006/0064695 A1 | 3/2006 | Burns et al. | |
| 2007/0124545 A1* | 5/2007 | Blanchard et al. | 711/152 |

* cited by examiner

*Primary Examiner* — Abdullah Al Kawsar
(74) *Attorney, Agent, or Firm* — Cantor Colburn LLP; John Campbell

(57) ABSTRACT

An embodiment provides for operating an information processing system. An aspect of the invention includes allocating an execution interval to a first logical processor of a plurality of logical processors of the information processing system. The execution interval is allocated for use by the first logical processor in executing instructions on a physical processor of the information processing system. The first logical processor determines that a resource required for execution by the first logical processor is locked by another one of the other logical processors. An instruction is issued by the first logical processor to determine whether a lock-holding logical processor is currently running. The lock-holding logical processor waits to release the lock if it is currently running. A command is issued by the first logical processor to a super-privileged process for relinquishing the allocated execution interval by the first logical processor if the locking holding processor is not running.

15 Claims, 4 Drawing Sheets

DETERMINATION OF RUNNING STATUS OF LOGICAL PROCESSOR

CROSS-REFERENCE TO RELATED APPLICATION

This application is a continuation of U.S. patent application Ser. No. 11/470,487, now issued U.S. Pat. No. 8,276,151, filed Sep. 6, 2006, the content of which is incorporated by reference herein in its entirety.

BACKGROUND OF THE INVENTION

The present invention relates to information processing systems and more specifically to a system and method for allocating an execution interval to one of a plurality of logical processors of an information processing system for executing instructions by a physical processor of the information processing system.

In some modern computing systems, particularly multi-processor information processing systems, many more logical processors can be defined than there are actual physical processors. Logically partitioned computing systems typically adhere to this model, such that each logical partition ("LPAR") of the computing system typically is assigned a limited number of physical processors, but a larger number of logical processors can be invoked for execution within the LPAR. In such case, each logical processor typically does not run all the time. Instead, each logical processor runs when it is invoked for execution by a super-privileged process on the computing system such as an operating system, referred to as a "host program." Alternatively, a logical processor can be invoked by an entity which has even higher privileges, e.g., a supervisory control program such as a "hypervisor" which allocates resources among the logical partitions of the computing system.

Certain resources within each LPAR of the computing system are subject to being shared by the logical processors of the LPAR. For example, certain data structures in kernel memory, communication channel resources and address spaces may be shared by different logical processors which perform related tasks. However, in order to avoid contention for resources and avoid the possibility that shared resources will appear different to two different logical processors, each shared resource can be protected by a "lock" mechanism. When one logical processor has control over a particular resource, a super-privileged process stores data indicating that that resource is currently "locked," such that it is not available for use by any other logical processor.

In view of the foregoing, the present application relates to an efficient way of handling when a particular resource is locked by one logical processor while another logical processor is seeking to use that same resource.

SUMMARY OF THE INVENTION

An embodiment includes a computer program product for operating an information processing system. The computer program product includes a tangible storage medium readable by a processing circuit which stores instructions for execution by the processing circuit and performs a method that includes allocating an execution interval to a first logical processor of a plurality of logical processors of the information processing system. The execution interval is allocated for use by the first logical processor in executing instructions on a physical processor of the information processing system. The first logical processor determines that a resource required for execution by the first logical processor is locked by another one of the other logical processors. Which one of the logical processors holds the lock on the resource is determined based on determining that the resource is locked. An instruction is issued by the first logical processor to determine whether the lock-holding logical processor is currently running. Based on determining that the lock-holding logical processor is currently running, the lock-holding logical processor waits to release the lock. Based on determining that the lock-holding logical processor is not currently running, a command is issued by the first logical processor to a super-privileged process for relinquishing the allocated execution interval by the first logical processor. The command identifies the lock-holding logical processor.

An additional embodiment includes a method for operating an information processing system. The method includes allocating an execution interval to a first logical processor of a plurality of logical processors of the information processing system. The execution interval is allocated for use by the first logical processor in executing instructions on a physical processor of the information processing system. The first logical processor determines that a resource required for execution by the first logical processor is locked by another one of the other logical processors. Which one of the logical processors holds the lock on the resource is determined based on determining that the resource is locked. An instruction is issued by the first logical processor to determine whether the lock-holding logical processor is currently running. Based on determining that the lock-holding logical processor is currently running, the lock-holding logical processor waits to release the lock. Based on determining that the lock-holding logical processor is not currently running, a command is issued by the first logical processor to a super-privileged process for relinquishing the allocated execution interval by the first logical processor. The command identifies the lock-holding logical processor.

A further embodiment includes a system for operating an information processing system. The system includes a computer processor configured to perform a method that includes allocating an execution interval to a first logical processor of a plurality of logical processors of the information processing system. The execution interval is allocated for use by the first logical processor in executing instructions on a physical processor of the information processing system. The first logical processor determines that a resource required for execution by the first logical processor is locked by another one of the other logical processors. Which one of the logical processors holds the lock on the resource is determined based on determining that the resource is locked. An instruction is issued by the first logical processor to determine whether the lock-holding logical processor is currently running. Based on determining that the lock-holding logical processor is currently running, the lock-holding logical processor waits to release the lock. Based on determining that the lock-holding logical processor is not currently running, a command is issued by the first logical processor to a super-privileged process for relinquishing the allocated execution interval by the first logical processor. The command identifies the lock-holding logical processor.

DETAILED DESCRIPTION

Figure 1:
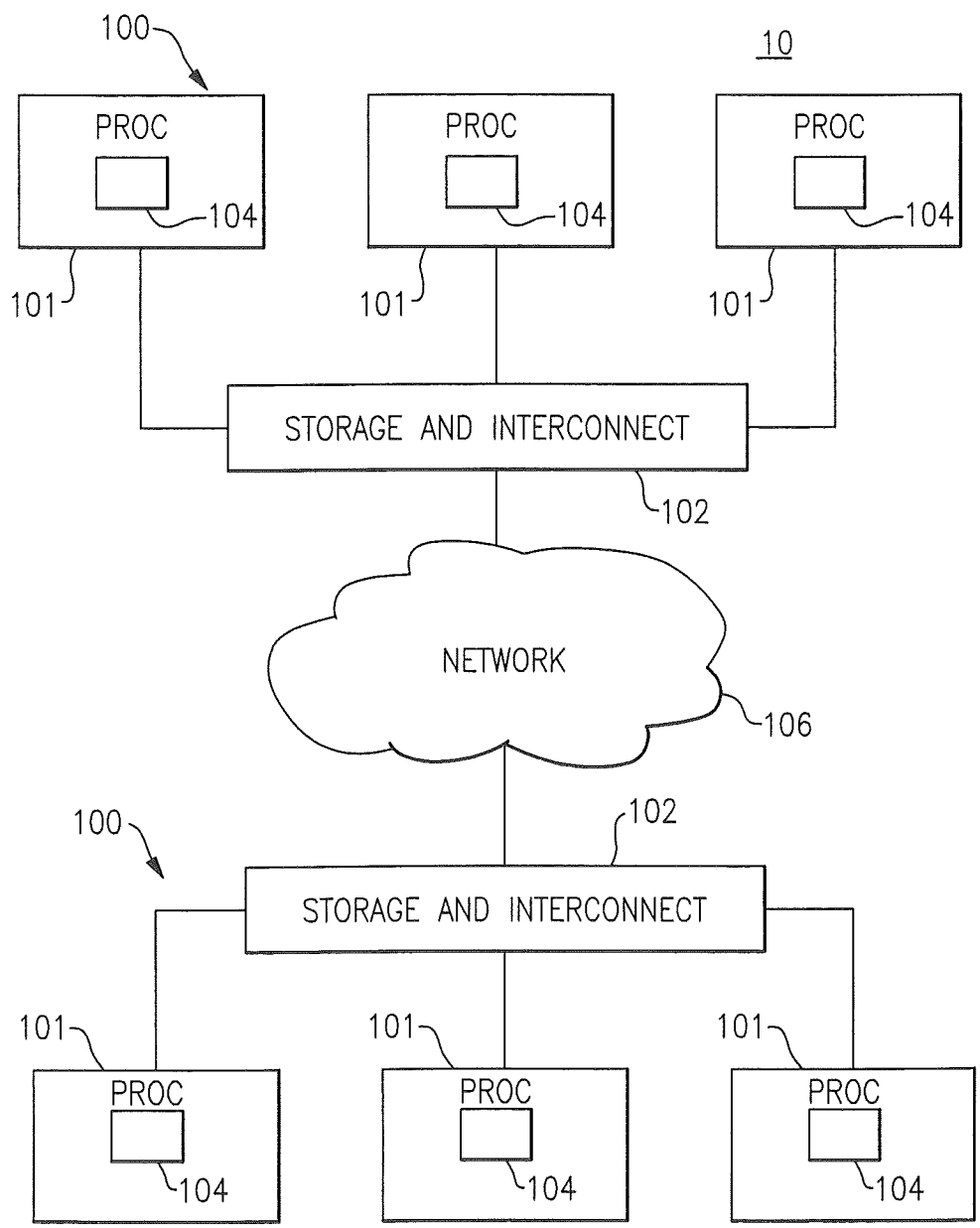
FIG. 1 is a block diagram illustrating an exemplary computing environment which supports use of the method and system in accordance with the embodiments of the invention.

FIG. 1 illustrates a computing environment 10 which supports the performance of a method in accordance with an embodiment of the invention. In the computing environment illustrated in FIG. 1, a multi-processor system 100 includes a plurality of physical processors 101 linked together via a common storage and interconnect subsystem 102, as shown in the upper half of FIG. 1. The term "physical processor" denotes the hardware together with microcode, firmware and lowest level processing software for enabling the physical processor to support the operation of an operating system and processes subject to its control. While the multi-processor system is illustrated with only three physical processors, it is possible for the multi-processor system to have fewer or a greater number of physical processors. The storage and interconnect subsystem 102 contains certain storage and communication resources which are subject to being shared among the physical processors. Typically, each physical processor also possesses processor-specific resources such as processor storage 104 or communication resources that are possessed exclusively by the physical processor. Sometimes, only certain reconfigurable portions of the processor storage 104 are possessed exclusively by a particular physical processor, while other reconfigurable portions are designated for the exclusive use of another one of the physical processors. The allocation of such processor storage 104 and portions of common storage within the storage and interconnect subsystem 102 is performed for a variety of goals such as performance, reliability and security.

As further shown in FIG. 1, the computing environment 10 includes a second multi-processor system 100, illustrated in the lower half of FIG. 1, the second multi-processor system 100 including physical processors 101 and a storage and interconnect subsystem 102 which, desirably are similar to those of the above-described multi-processor system, but which need not be the same. Each physical processor contains the computing resources, e.g., state machines and other hardware and microprograms which assist in operating the hardware to execute instructions. Each physical processor may further include a set of extended microprograms known as "millicode" which also assist in operating the hardware when executing an instruction.

A network 106, e.g., one which can operate with a high data transmission rate or which might not, supports the transmission of data between the two multi-processor systems 100, as well as control messages which facilitate or manage such data transmission. In one example, the two multi-processor systems can operate as loosely-coupled systems, each of which executes an independent process, but in which data and/or instructions, such as, for example, "applets" are distributed ad hoc or occasionally between the two multi-processor systems. In another example, the two multi-processor systems can operate as tightly-coupled systems in which data and/or instructions are exchanged frequently, such as for parallel processing of a task having a large computing volume.

Figure 2:
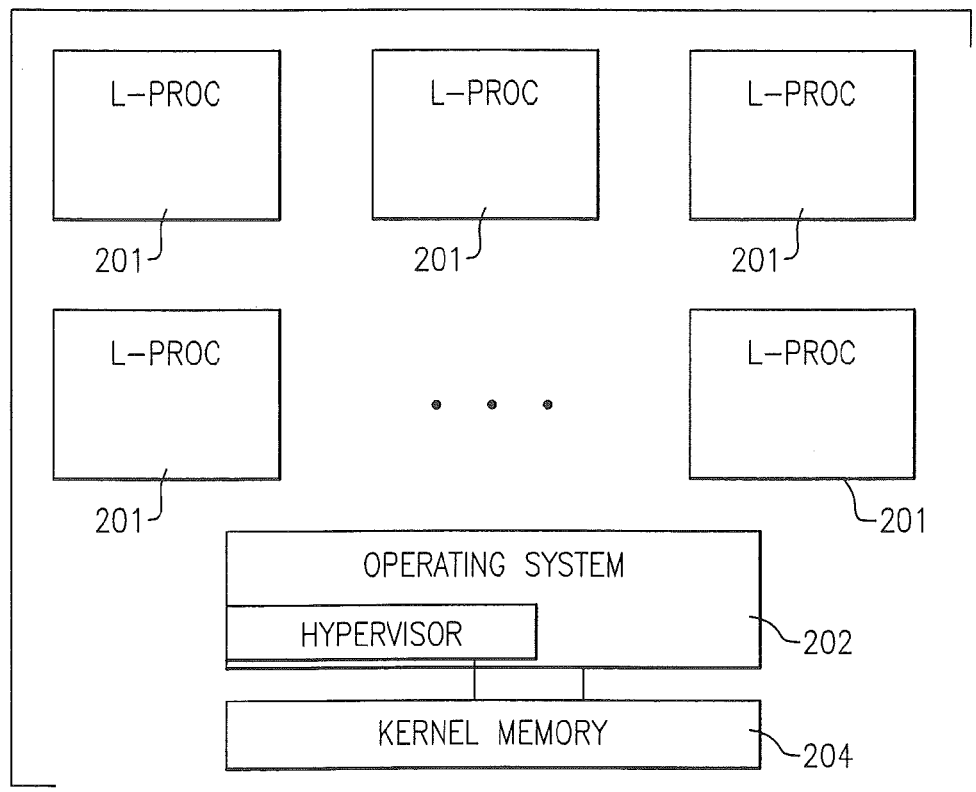
FIG. 2 is a block diagram illustrating a configuration of an information processing system in accordance with one embodiment of the invention.

FIG. 2 is a diagram illustrating an exemplary information processing system 200, which can be supported by a multi-processor system 100 as illustrated and described above with reference to FIG. 1. As illustrated therein, the information processing system 200 includes a plurality of logical processors 201, each of which, when running, i.e., when invoked by an operating system 202 for execution, is capable of executing a program to carry out a process. The operating system 202 allocates and maintains state variables for permitting each logical processor to execute a program while it is running, and return the results of execution to storage or in form or updated state variables to the operating system. Logical processors, while being granted privileges to define and alter state variables relating to certain processes they execute, are precluded from granting or altering other state variables which have a more global effect and are precluded from allocating certain other resources on their own. For this reason, the logical processors are deemed to execute a process which has only ordinary privileges. When a logical processor utilizes a particular, e.g., a data structure, region of memory and/or a communication resource, a "lockword" is stored in kernel memory of the information processing system to indicate that the one logical processor has control of the particular resource. At such time, the resource is considered "locked" by that logical processor, such that no other logical processor is permitted to use that resource until the lock is released again. That logical processor is considered to be "holding the lock" on the resource.

On the other hand, the operating system, having greater privileges, executes a "super-privileged" process for granting or altering the more global state variables and other resources. Typically, the operating system 202 stores and accesses the state variables, stores and accesses program status words, as well as register states in a reserved section of memory known as a kernel memory 204. In a so-called "native" mode of operation, the operating system controls the allocation and management of all the resources of the multi-processor system including kernel memory 204, shared system memory contained in the storage and interconnect subsystem 102 and, in some cases, processor storage 104, as well.

Modern multi-processor systems permit multiple different operating systems and multiple images of the same operating system to run simultaneously, in a mode of operation known as logically partitioned ("LPAR") mode. In LPAR mode, a super-privileged process known as a "hypervisor" has even greater privileges than an operating system. The super-privileged hypervisor controls the allocation of resources to the multiple operating systems and/or multiple operating system images such that each operating system and operating system image obtains needed resources without conflict. Kernel memory resources needed to store state variables are among those allocated to the operating systems and operating system images by the hypervisor.

Figure 3:
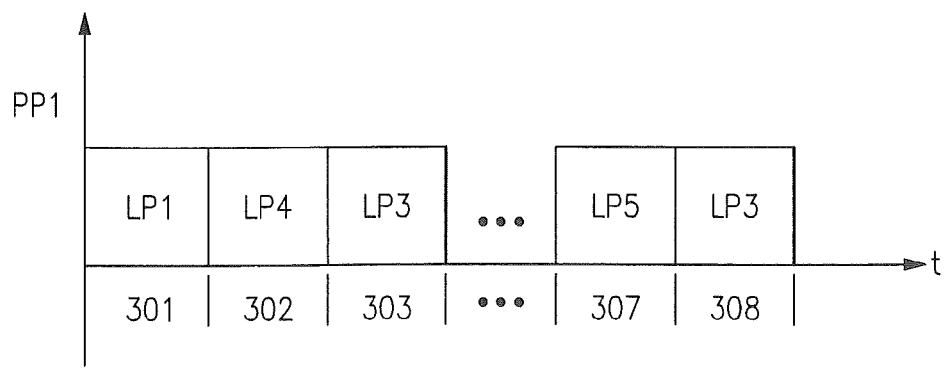
FIG. 3 is a diagram illustrating an allocation of execution intervals with respect to time among logical processors of an information processing system as illustrated in FIG. 2.

Typically, the logical processors do not have exclusive use of the actual physical processors of the information processing system. As hardware resources, the actual physical processors are shared among the logical processors in a time-dependent manner. Specifically, the use of each physical processor is allocated sequentially to the respective logical processors of the computing system in a sequence of intervals, which are hereinafter referred to as "execution intervals." Execution intervals have also been referred to as "timeslices." Each of the logical processors of the information processing system may be allocated one or more execution intervals for executing instructions on a particular physical processor. For example, as illustrated in FIG. 3, in an exemplary embodiment, a series of execution intervals or "timeslices" are allocated to certain logical processors of the system. Each execution interval typically lasts for many machine cycles of the allocated physical processor of the information processing system. This allows time for a logical processor of the system to be invoked, to execute a series of instructions using the allocated physical processor, and then to preserve the execution state of the logical processor upon invoking a different logical processor, so that the one logical processor sees the same execution state the next time that it is invoked.

In the example shown in FIG. 3, a first logical processor LP1 is allocated an execution interval 301 on the first physical processor ("PP1") at a first point in time, after which an execution interval 302 is allocated to the fourth logical processor LP4. Then, the third logical processor LP3 is allocated execution interval 303 on the physical processor PP1. Later, an execution interval 307 is allocated to the logical processor LP5, after which execution interval 308 is allocated to the logical processor LP3.

In the above example, it is not necessary that the execution intervals are allocated to the logical processors sequentially according to the numbers assigned to each logical processor. In addition, it is usually not necessary that an execution interval be allocated evenly to every logical processor before the next time that a particular logical processor is allocated an execution interval again. Execution intervals are allocated to each logical processor in accordance with its particular need for executing instructions at each instant in time. Therefore, certain ones of the logical processors which are not running can be skipped at a particular point in time and not allocated an execution interval, while other logical processors can be granted execution intervals more frequently.

Figure 4:
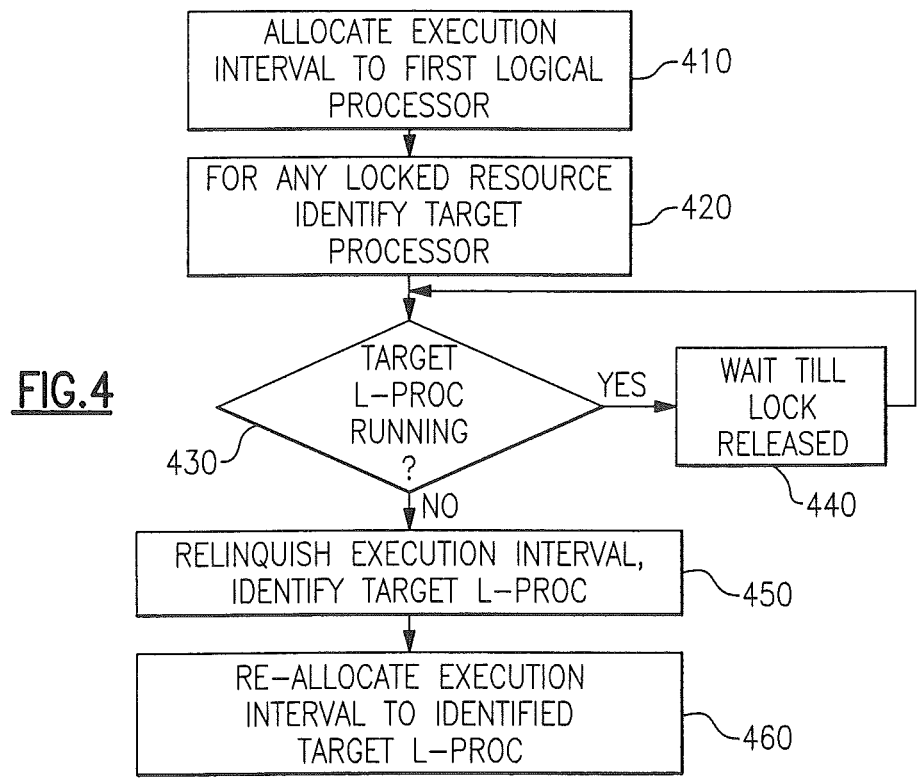
FIG. 4 is a flowchart illustrating a method of operating an information processing system in accordance with an embodiment of the invention.

FIG. 4 is a flow diagram illustrating an exemplary method of operating an information processing system in accordance with an embodiment of the invention. As shown therein, in a first step 410 of the method, an execution interval is allocated to a first logical processor of the information processing system. In this connection, the "first" logical processor can be any logical processor of the system, regardless of the number assigned thereto, the term "first" simply being a convenient way of referencing any one of the logical processors. While running, the first logical processor determines a set of resources it requires in order to complete execution of a set of instructions. In addition, the first logical processor also determines whether any of the required resources are currently "locked" by any other logical processor. For locked resources, a lockword is stored in kernel memory or other privileged memory to which the first processor has access while it is running to read and determine its locked status of the resource, as well as the identity of the logical processor which holds the lock. Thus, from such lockwords, in step 420 the first logical processor determines the identity of any other logical processors which have locked resources needed by the first logical processor for executing instructions. Any such logical processor which holds a lock to a resource needed by the first logical processor is referred to herein variously as a lock-holding logical processor or a "target" logical processor.

Thereafter, in step 430, the first logical processor determines whether the target logical processor is running. An instruction issued from the first logical processor to the target logical processor known as a "sense running status" signal order can be used to determine the running status of the target logical processor. The sense running status signal order is issued by the first logical processor while the first logical processor remains running, i.e., without the first logical processor intercepting to a super-privileged process such as the operating system or hypervisor. The response to that instruction, typically in form of a compact series of pre-defined information bits, identifies whether the target logical processor is currently running or not. A preferred procedure is for determining the running status of the target processor is described below with reference to FIGS. 5 and 6.

When in step 430 the first logical processor determines that the target logical processor holding the lock is currently running, the first logical processor determines that the lock held by the target logical processor is likely to be released soon. Based on that determination, in step 440 the first logical processor waits a number of machine cycles. Eventually, the first logical processor returns to step 430 and checks again whether the target logical processor still holds the lock for the resource and whether the target logical processor is still running. This operation of waiting and checking to determine whether a locked resource becomes available is commonly referred to as "spinlock," in that the logical processor that needs a resource "spins" (waits and checks again) until a locked resource is freed up.

However, sometimes at step 430 it is determined that the target logical processor which holds the lock for the resource is not running. With the target logical processor not running, it will not be able to free up the locked resource during the current execution interval in which the first logical processor needs the resource. Therefore, at step 450, the first logical processor issues a command relinquishing the current execution interval to the super-privileged process. The command also identifies the target logical processor which currently holds the lock for the resource needed by the first logical processor.

Such command is issued by the first logical processor preferably in form of a "diagnose" command which indicates the number of the logical processor which holds the lock. After the first logical processor issues the diagnose command, state is saved for the first logical processor and the super-privileged process takes over from the first logical processor. With the identity of the target logical processor indicated by the command, the command effectively serves as a request to the super-privileged process for reallocating an execution interval to the target logical processor. In response to the command, in step 460 the super-privileged process can, when possible, allocate the execution interval that was just relinquished by the first logical processor to the target logical processor identified by the command. Alternatively, the super-privileged process can allocate an execution interval to the target logical processor that is somewhat later in time and different from the one just relinquished by the first logical processor.

Such a request increases the efficiency of execution by the first logical processor and the target logical processor because the first logical processor does not spend time needlessly waiting for another logical processor that is not currently running to release the lock on a particular resource. In addition, the target logical processor obtains an execution interval sooner so that it may finish using the locked resource at an earlier point in time, and then unlock the resource. When the target logical processor has finished using the resource and released the lock thereon, during the next execution interval allocated to the first logical processor, the first logical processor has access and can use the previously locked resource.

In the event that the target logical processor has not finished using the locked resource by the time the next execution interval is allocated to the first logical processor, the method described above with respect to FIG. 4 is utilized again. The first logical processor again relinquishes the execution interval and it is reallocated to the target logical processor. Preferably, the super-privileged process records the number of times an execution interval is reallocated from one logical processor to another logical processor because of a particular locked resource. Using such record, the super-privileged process manages contention for resources and supervises operation of the logical processors. In this way, the super-privileged process avoids particular pairs of logical processors from operating in an endless loop, with each logical processor waiting for the other logical processor to release a lock on a particular resource it needs.

Figure 5:
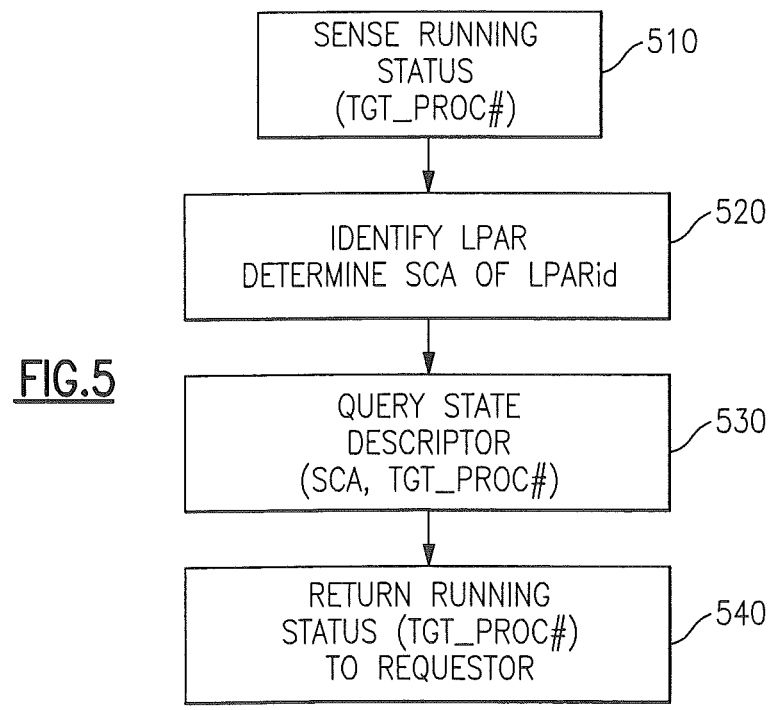
FIG. 5 is a flowchart illustrating a procedure for determining a running status of a target logical processor in accordance with an embodiment of the invention.
Figure 6:
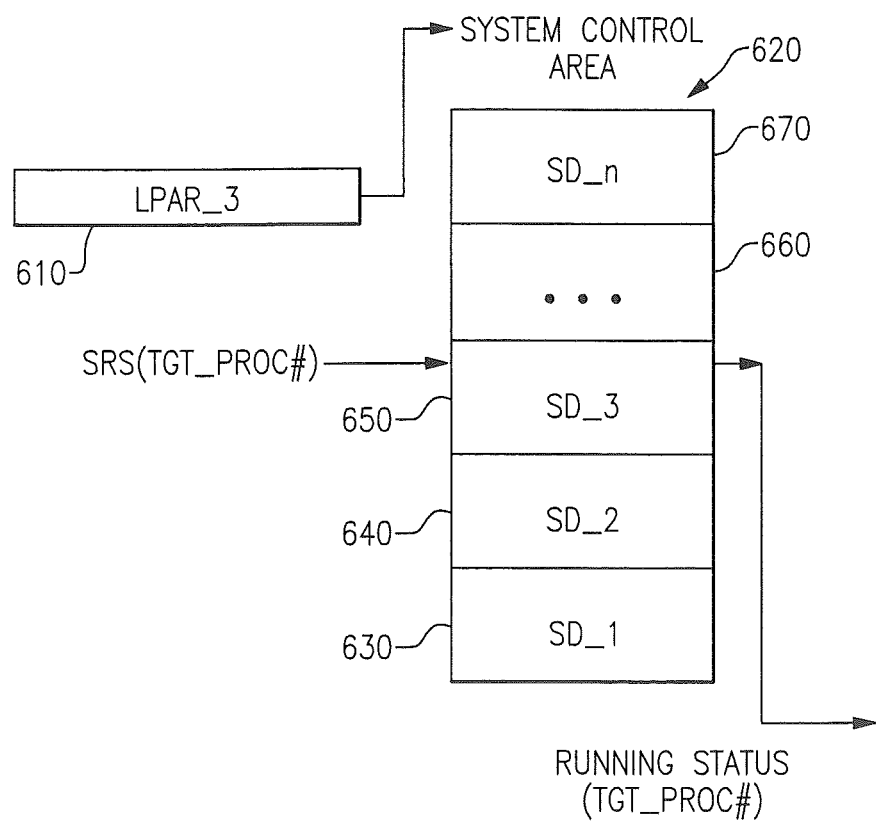
FIG. 6 is a diagram illustrating the referencing of data to determine a running status of a target logical processor in accordance with an embodiment of the invention.

A preferred method for a first logical processor to determine the running status of another logical processor will now be described, with reference to FIGS. 5 and 6. In block 510, a first logical processor issues an instruction "SENSE RUNNING STATUS(TGT_PROC#)," identifying the target logical processor for which it needs the running status. Subsequent processing in blocks 520, 530 and 540 of the procedure is performed by a physical processor of the information processing system, preferably the physical processor on which the first logical processor is currently running. Such processing can be performed as a result of decoding and executing the SENSE RUNNING STATUS instruction by hardware, e.g., one or more hardware state machines. In another example, such processing can be performed by hardware as assisted by one or more microprograms ("microcode"), millicode and/or firmware of the information processing system. In yet another example, such processing can be performed partly by one or more hardware state machines and partly by hardware assisted by microcode, millicode and/or firmware of the information processing system. In block 520, during execution of the instruction, the logical partition to which the first logical processor and the target logical processor belong is identified, as well as an address for accessing a corresponding system control area relating to that logical partition. Referring to FIG. 6, a state descriptor 610 is maintained by the hypervisor, containing information regarding the individual logical partition (LPAR) of the computing system, for example, LPAR_3. When the SENSE RUNNING STATUS instruction is executed, the state descriptor 610 is referenced to determine the address in kernel memory at which a system control area ("SCA") 620 begins which corresponds to that logical partition. The system control area 620 includes a series of state descriptors SD_1 (630), SD_2 (640), SD_3 (650), 660, SD_n (670), etc., in kernel memory. Each of these state descriptors is used by a super-privileged process (host program or hypervisor) to record the state of a corresponding logical processor. In this example, the state descriptor 650 corresponds to the requested target logical processor.

In block 530 (FIG. 5), the state descriptor 650 in the identified SCA (620; FIG. 6) is queried to determine the running status of the requested target logical processor of the identified logical partition. In block 540, the running status of the target logical processor is returned (reported back) as "running" or "not running" to the logical processor which requested it.

While the invention has been described in accordance with certain preferred embodiments thereof, many modifications and enhancements can be made thereto without departing from the true scope and spirit of the invention, which is limited only by the claims appended below.

What is claimed is:

1. A computer program product for operating an information processing system, the computer program product comprising:
 a non-transitory storage medium readable by a processing circuit and storing instructions for execution by the processing circuit for performing a method comprising:
  allocating an execution interval to a first logical processor of a plurality of logical processors of the information processing system, the execution interval being allocated for use by the first logical processor in executing instructions on a physical processor of the information processing system;
  determining by the first logical processor that a resource required for execution by the first logical processor is locked by another one of the plurality of logical processors;
  determining which one of the plurality of logical processors holds the lock on the resource based on determining that the resource is locked, and issuing an instruction by the first logical processor to determine whether the lock-holding logical processor is currently running;
  waiting for the lock-holding logical processor to release the lock, based on determining that the lock-holding logical processor is currently running; and
  issuing a command by the first logical processor to a super-privileged process for relinquishing the allocated execution interval by the first logical processor, based on determining that the lock-holding logical processor is not currently running, the command identifying the lock-holding logical processor.

2. The computer program product as claimed in claim 1, wherein the command includes a diagnose command and the information identifying the lock-holding logical processor is included in the diagnose command.

3. The computer program product as claimed in claim 1, wherein the command requests the super-privileged process to re-allocate the execution interval to the lock-holding logical processor.

4. The computer program product as claimed in claim 3, wherein the method further comprises re-allocating the execution interval by the super-privileged process from the first logical processor to the lock-holding logical processor.

5. The computer program product as claimed in claim 1, wherein the determining that the resource is locked by the another logical processor is performed by checking processor address information of a lockword corresponding to the resource.

6. A method of operating an information processing system, the method comprising:
 allocating an execution interval to a first logical processor of a plurality of logical processors of the information processing system, the execution interval being allocated for use by the first logical processor in executing instructions on a physical processor of the information processing system;
 determining by the first logical processor that a resource required for execution by the first logical processor is locked by another one of the plurality of logical processors;
 determining which one of the plurality of logical processors holds the lock on the resource based on determining that the resource is locked, and issuing an instruction by the first logical processor to determine whether the lock-holding logical processor is currently running;

waiting for the lock-holding logical processor to release the lock, based on determining that the lock-holding logical processor is currently running; and issuing a command by the first logical processor to a super-privileged process for relinquishing the allocated execution interval by the first logical processor, based on determining that the lock-holding logical processor is not currently running, the command identifying the lock-holding logical processor.

7. The method as claimed in claim 6, wherein the command includes a diagnose command and the information identifying the lock-holding logical processor is included in the diagnose command.

8. The method as claimed in claim 6, wherein the command requests the super-privileged process to re-allocate the execution interval to the lock-holding logical processor.

9. The method as claimed in claim 8, wherein the method further comprises re-allocating the execution interval by the super-privileged process from the first logical processor to the lock-holding logical processor.

10. The method as claimed in claim 6, wherein the determining that the resource is locked by the another logical processor is performed by checking processor address information of a lockword corresponding to the resource.

11. A system for operating an information processing system comprising:
   a computer processor configured to perform a method comprising:
   allocating an execution interval to a first logical processor of a plurality of logical processors of the information processing system, the execution interval being allocated for use by the first logical processor in executing instructions on a physical processor of the information processing system;
   determining by the first logical processor that a resource required for execution by the first logical processor is locked by another one of the plurality of logical processors;
   determining which one of the plurality of logical processors holds the lock on the resource based on determining that the resource is locked, and issuing an instruction by the first logical processor to determine whether the lock-holding logical processor is currently running;
   waiting for the lock-holding logical processor to release the lock, based on determining that the lock-holding logical processor is currently running; and
   issuing a command by the first logical processor to a super-privileged process for relinquishing the allocated execution interval by the first logical processor, based on determining that the lock-holding logical processor is not currently running, the command identifying the lock-holding logical processor.

12. The system as claimed in claim 11, wherein the command includes a diagnose command and the information identifying the lock-holding logical processor is included in the diagnose command.

13. The system as claimed in claim 11, wherein the command requests the super-privileged process to re-allocate the execution interval to the lock-holding logical processor.

14. The system as claimed in claim 13, wherein the method further comprises re-allocating the execution interval by the super-privileged process from the first logical processor to the lock-holding logical processor.

15. The system as claimed in claim 11, wherein the determining that the resource is locked by the another logical processor is performed by checking processor address information of a lockword corresponding to the resource.

* * * * *